United States Patent
Yadav et al.

(10) Patent No.: US 10,190,759 B2
(45) Date of Patent: *Jan. 29, 2019

(54) CIRCUIT BOARDS FOR LED-BASED LIGHT FIXTURES

(71) Applicant: HUBBELL INCORPORATED, Shelton, CT (US)

(72) Inventors: Pritam Yadav, Greenville, SC (US); T. Warren Weeks, Jr., Simpsonville, SC (US); E. Thomas Hill, III, Spartanburg, SC (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,139

(22) Filed: Mar. 26, 2018

(65) Prior Publication Data

US 2018/0209626 A1 Jul. 26, 2018

Related U.S. Application Data

(63) Continuation of application No. 14/575,907, filed on Dec. 18, 2014, now Pat. No. 9,970,639.

(51) Int. Cl.
```
F21S 2/00      (2016.01)
F21V 23/00     (2015.01)
F21V 23/04     (2006.01)
H05B 33/08     (2006.01)
H05B 37/02     (2006.01)
F21V 21/005    (2006.01)
```
(Continued)

(52) U.S. Cl.
CPC ............ *F21V 23/005* (2013.01); *F21S 2/005* (2013.01); *F21V 23/04* (2013.01); *H05B 33/0809* (2013.01); *H05B 33/0812* (2013.01); *H05B 33/0857* (2013.01); *H05B 33/0872* (2013.01); *H05B 37/0272* (2013.01); *F21V 21/005* (2013.01); *F21V 23/0442* (2013.01); *F21Y 2103/10* (2016.08); *F21Y 2115/10* (2016.08); *Y02B 20/343* (2013.01)

(58) Field of Classification Search
CPC .... F21V 23/005; F21V 23/0042; F21V 23/06; H05B 33/0809; F21K 9/238; F21K 9/278
See application file for complete search history.

(56) References Cited

U.S. PATENT DOCUMENTS 6,499,860 B2   12/2002  Begemann
7,560,677 B2   7/2009   Lyons et al.
(Continued)

OTHER PUBLICATIONS

PCT International Search Report and Written Opinion dated Feb. 5, 2016 from corresponding Application No. PCT/US2015/065938, 11 pages.
(Continued)

*Primary Examiner* — William N Harris
(74) *Attorney, Agent, or Firm* — Dilworth IP, LLC

(57) ABSTRACT

A light fixture having master circuit boards and one or more LED circuit boards connectable in various alternative combinations for light fixtures having alternative lengths, the master board including a switch and AC-DC rectifier and the LED boards including linear AC drivers and one or more LED arrays, the switch on the master board controlling the linear AC drivers on the LED board or boards.

22 Claims, 17 Drawing Sheets

(51) Int. Cl.
*F21Y 103/10* (2016.01)
*F21Y 115/10* (2016.01)

(56) References Cited

U.S. PATENT DOCUMENTS

| | | | |
|---|---|---|---|
| 2007/0159833 A1 | 7/2007 | Netzel, Sr. et al. | |
| 2009/0135597 A1* | 5/2009 | Kay | F21K 9/00 |
| | | | 362/247 |
| 2010/0314985 A1 | 12/2010 | Premysler | |
| 2010/0315019 A1 | 12/2010 | Hoogzaad et al. | |
| 2011/0095704 A1 | 4/2011 | Moussakov et al. | |
| 2013/0057178 A1 | 3/2013 | Doan | |
| 2013/0083522 A1 | 4/2013 | Bowers et al. | |
| 2014/0168965 A1 | 6/2014 | Moon et al. | |
| 2014/0175988 A1 | 6/2014 | Plourde et al. | |
| 2015/0130356 A1* | 5/2015 | Plourde | H05B 33/0803 |
| | | | 315/153 |
| 2015/0327349 A1* | 11/2015 | Lee | F21K 9/232 |
| | | | 362/294 |
| 2018/0045381 A1* | 2/2018 | Van de Ven | F21V 29/70 |

OTHER PUBLICATIONS

"Design-in Guide: Philips Advance Outdoor Fixed and Dimmable Xitanium LED Driver", Philips Lighting, pp. 1-16, 2014.
"TPS92411: Switched Direct rive Solution for Offline LED Lighting", Texas Instruments, pp. 1-26.
"Floating Switch for Offline AC Linear Direct Drive of LEDs with Low Ripple Current", Texas Instruments, pp. 1-20, Oct. 2013.

* cited by examiner

CIRCUIT BOARDS FOR LED-BASED LIGHT FIXTURES

BACKGROUND

Technical Field

This disclosure relates generally to the field of light fixtures. More particularly, the disclosure relates to circuit boards for light-emitting diode (LED) based light fixtures.

Background Art

Some product lines of light-emitting diode based light fixtures have multiple alternative models with different dimensions. For example, some light fixtures may be designed to be mounted under cabinets. Depending on the space available under the cabinet and other factors, customers may want light fixtures of different lengths. In order to satisfy that demand, manufacturers produce light fixtures tailored to each variation in length.

SUMMARY

Embodiments of the disclosure include light fixtures that generate light produced by one or more light sources, such as light emitting diode (LED) arrays. In some embodiments, the light fixture includes a master circuit board ("master boards") and one or more LED circuit boards ("LED boards") that can be connected together to produce light along increasing length as more LED boards are connected. In other embodiments, a master board and one or more LED boards of a limited number of alternative lengths are connected in various combinations to produce light along different lengths depending on the combinations selected. Each assembly of boards may be used to fit within a light fixture of a specific length or shape. By using LED boards of a standard length, or combining LED boards of a limited number of alternative standard lengths and a limited number of alternative shapes, light fixtures of many different shapes and lengths may be supported with a limited number of circuit board stocking units (SKUs). Having fewer SKUs simplifies inventory management.

In some embodiments, the master board has a connection to receive alternating current (AC) power from an external power source. In some embodiments, the connection is formed using soldered wires, a wire to board conductor, a board to board conductor, various standard electrical connectors, or other means of making an electrical connection. An AC-DC rectifier receives the AC power and drives direct-current (DC) power. The DC power is then routed to one of several channels as selected by a switch. In other embodiments, the AC power is routed to one of several channels as selected by the switch. Each channel has an AC-DC rectifier to produce direct-current (DC) power on that channel. In some embodiments, the power channels are routed along with a reference channel to a connection for connection to an LED board.

In some embodiments, each LED board includes at least one connection to receive the channels and route each channel to drive one or more linear AC drivers. The linear AC drivers drive an LED array. The particular linear AC drivers that drive the LED array at any particular time depends on which channel is powered by the master board. The channel that is powered by the master board depends on which channel is selected by the switch on the master board. In some embodiments, one channel powers linear AC drivers generating more current than the linear AC drivers powered by another channel. When the first channel is selected, the LED array receives more current and generates more light and high flux than when the second channel is selected. In some embodiments, the selected channels may enable corresponding control features such as motion sensing, daylight sensing and wireless controls.

In some embodiments, the LED board includes two LED arrays. Some linear AC drivers are coupled to drive one LED array and other linear AC drivers are coupled to drive the other LED array. The LED array being driven at any particular time depends on which channel is powered by the master board which in turn depends on which channel is selected by the switch on the master board. In some embodiments, the LED arrays are different in at least some characteristics such as correlated color temperature (CCT), color rendering index (CRI), or monochromatic color.

In some embodiments, the first LED array has LEDs of one CCT and the second LED array has LEDs of another CCT. When the first channel is selected, the light fixture generates light of one CCT and when the second channel is selected the light fixture generates light of the other CCT.

In some embodiments, the first LED array has LEDs of one CRI and the second LED array has LEDs of another CRI. When the first channel is selected, the light fixture generates light of one CRI and when the second channel is selected the light fixture generates light of the other CRI.

In some embodiments, the first LED array has LEDs of one monochromatic colors such as red, green, blue or white (RGBW) and the second LED array has LEDs of another monochromatic color. When the first channel is selected, the light fixture generates light of one monochromatic color and when the second channel is selected the light fixture generates light of the other monochromatic color.

In some embodiments, a jumper is included between two channels on the LED board. When the jumper is shorted, both channels are powered when either channel is selected on the master board. If each channel would otherwise select different current levels, both sets of drivers are simultaneously powered with the jumper is shorted to produce a higher current level than either channel would otherwise generate. If each channel would otherwise select different color LEDs, LEDs of both colors are simultaneously powered with the jumper shorted. If each channel would otherwise select LEDs having different color temperatures, with the jumper shorted an intermediate color temperature is produced by the simultaneously powered LED arrays.

In some embodiments, the linear AC drivers are constant current regulators. In other embodiments, the linear AC drivers are ASICs. Other drivers may be used.

In some embodiments, the master board includes one or more protection circuits, arc/transient suppressor circuits, damping circuits and snubber circuits.

In some embodiments, a rotary switch or other mechanical or electrical switch is used to select one of two or more channels. By selecting a different channel, different LED arrays, current levels, control features, and other options may be selected in various combinations on connected LED boards.

Reference in this specification to "one embodiment" or "an embodiment" means that a particular feature, structure, characteristic, advantage or benefit described in connection with the embodiment is included in at least one embodiment of the disclosure, but may not be exhibited by other embodiments. The appearances of the phrase "in one embodiment" in various places in the specification are not necessarily all referring to the same embodiment, nor are separate or alternative embodiments mutually exclusive of other embodiments. Similarly, various requirements are described which may be requirements for some embodiments but not for other embodiments. The specification and drawings are to be regarded in an illustrative sense rather than a restrictive sense. Various modifications may be made thereto without departing from the spirit and scope as set forth in the claims.

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description.

Figure 1:
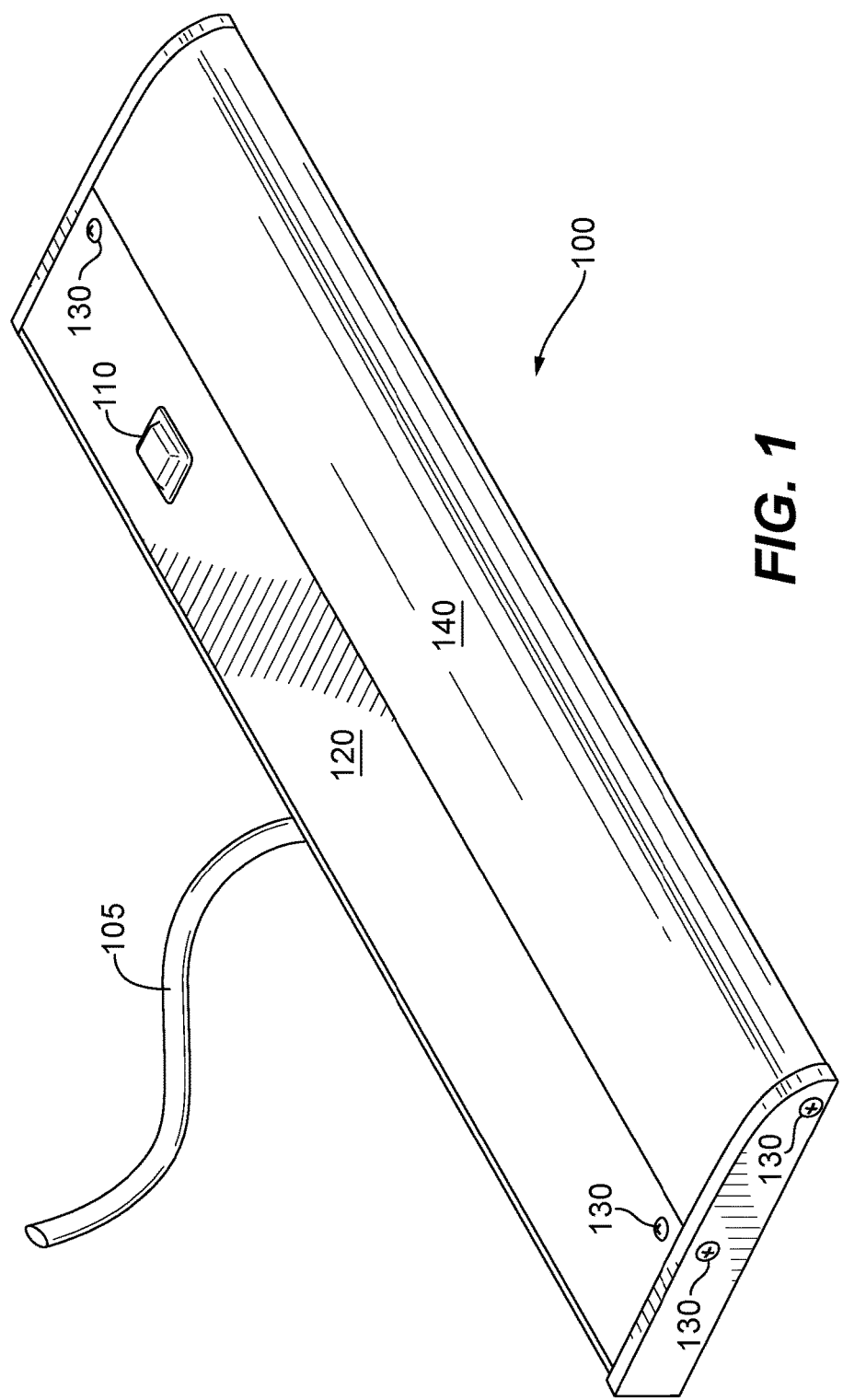
FIG. 1 illustrates one embodiment of a light fixture.

FIG. 1 illustrates one embodiment of a lighting fixture.

The light fixture has a frame 100 and receives power through a power cord 105. The light fixture is controlled by a switch 110 connected to a master circuit board ("master board") that is covered by a cover 120 mounted to the frame 100 using screws 130. The LED circuit boards ("LED boards") generate light that passes through a lens 140. The master board and the LED boards are obscured by the cover 120 and the lens 140. In some embodiments, the power cord 105 is a wire lead.

Figure 2:
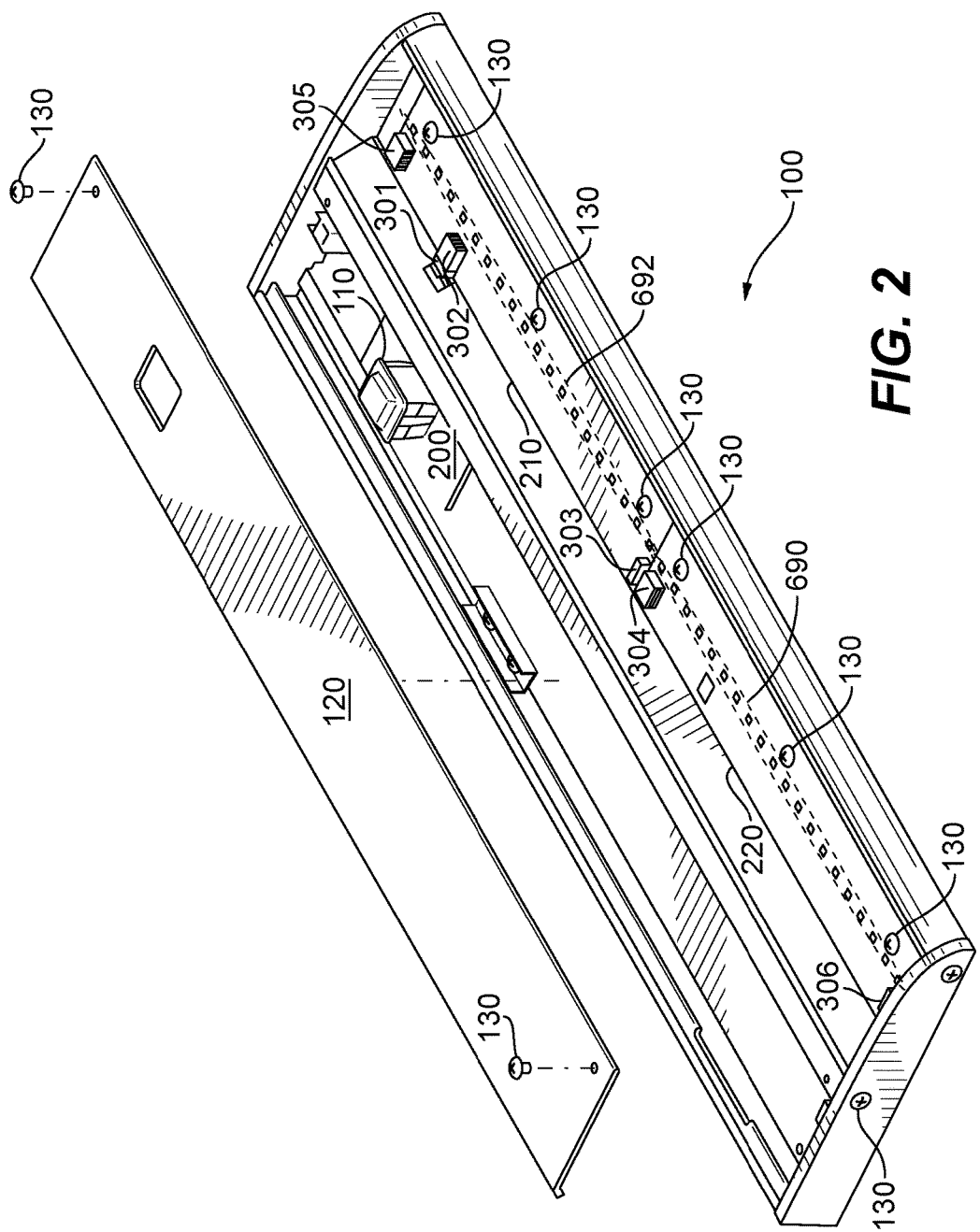
FIG. 2 shows a partially exploded view of one embodiment of a light fixture.

FIG. 2 illustrates a partially exploded view of the light fixture. The power cord 105 and the lens 140 are not shown.

Two of the screws 130 are removed and the cover 120 is lifted to show a master board 200 including the switch 110.

The master board 200 includes a connection 301 that connects to a connection 302 on an LED board 210. The LED board 210 includes a connection 303 that connects to a connection 304 on an LED board 220. The LED board 210 and the LED board 220 are mounted on the frame 100 of the light fixture using screws 130.

The LED board 210 has an LED array 692 that has many LEDs that are dispersed along the length of the LED board 210 to generate light when powered. The LED board 220 has an LED array 690 that has many LEDs that are dispersed along the length of the LED board 220 to generate light when powered. An LED 691 is one of the LEDs in the LED array 690.

The LED board also includes a connection 305 and a connection 306 (partially obscured) that are not connected to adjacent LED boards.

Figure 3:
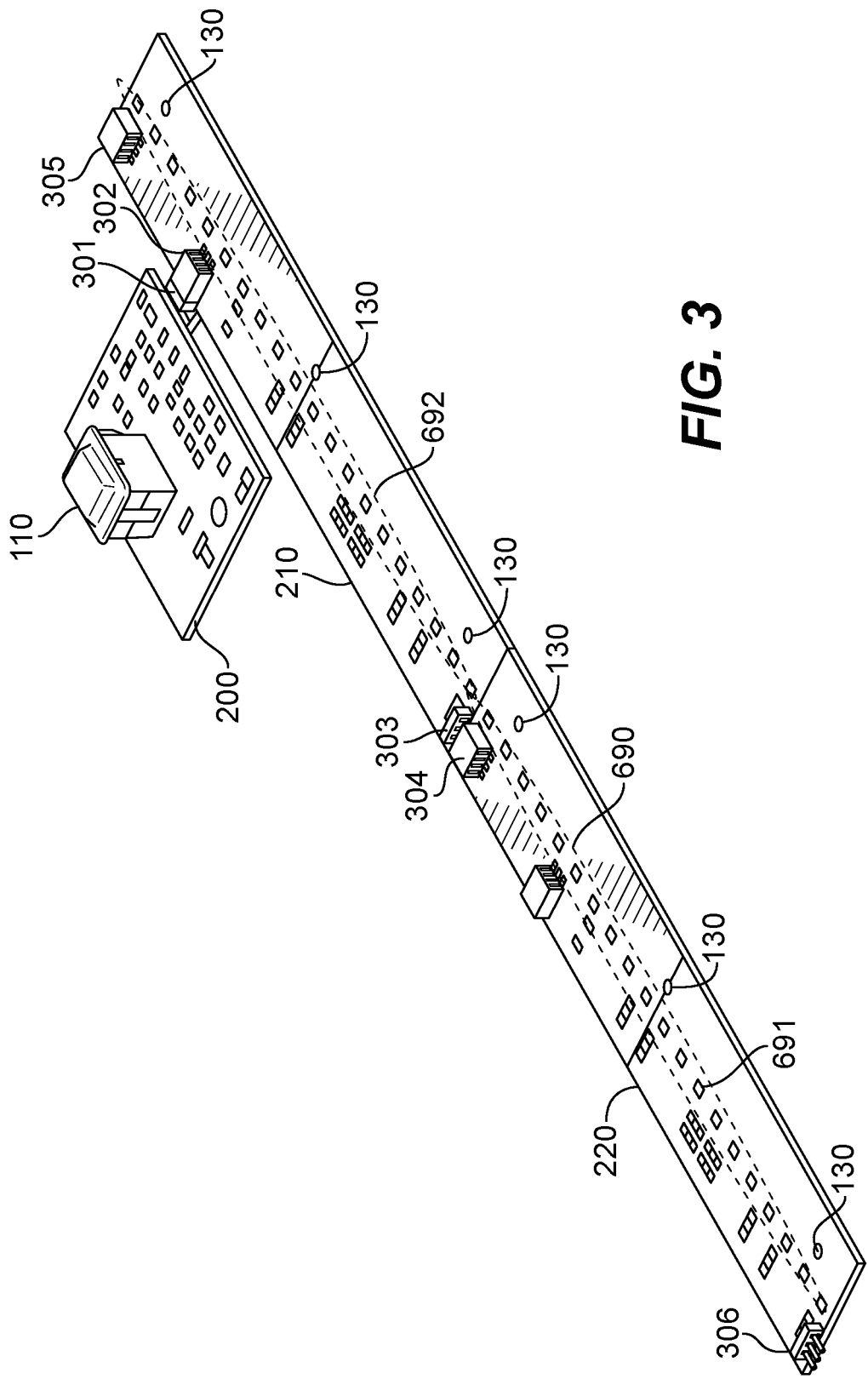
FIG. 3 illustrates one embodiment of an assembly of a master board and two LED boards.

FIG. 3 shows the assembly of the master board 200, the LED board 210 and the LED board 220. The assembly includes the switch 110, the connections 301-306, the LED array 690 and the LED array 692. The LED 691 is one of the LEDs in the LED array 690.

In some embodiments, an additional LED board is connected to the connection 305 or the connection 306, or both connections, to extend the length of the assembly. In other embodiments, more LED boards are connected to those additional LED boards to extend the assembly further. In some embodiments, the LED boards may be round, a square, or a polygon, or other shapes. In some embodiments, connections are placed at various alternative or additional locations on each LED board to allow for flexibility in the assembly of multiple boards of particular shapes and sizes or combinations of shapes and sizes.

Table 1 shows various combinations of three types of boards that can be used to produce light fixtures having certain nominal lengths. Each combination uses a single master board. Two types of standard length LED boards are used. A rectangular 8-inch LED board (the first type) and a rectangular 11-inch LED board (the second type) are used in various combinations for light fixtures having nominal lengths of 9 inches, 12 inches, 18 inches, 21 inches, 24 inches, 27 inches and 36 inches. Table 1 shows two standard lengths of rectangular LED boards can be combined in various combinations to support seven different size light fixtures. In some embodiments, the nominal fixture length is extended further with additional standard LED boards.

TABLE 1

Linear Fixture Length Combinations

| Nominal Fixture Length | Master Board Count | 8-inch LED Board Count | 11-inch LED Board Count |
| --- | --- | --- | --- |
| 9-inch | 1 | 1 | |
| 12-inch | 1 | | 1 |
| 18-inch | 1 | 2 | |
| 21-inch | 1 | 1 | 1 |
| 24-inch | 1 | | 2 |
| 27-inch | 1 | 3 | |
| 36-inch | 1 | | 3 |

In some embodiments, one or more LED boards of one type of standard length may be used. In other embodiments, three of more types of standard length LED boards may be combined in various ways to produce light fixtures of different nominal fixture lengths.

Figure 4:
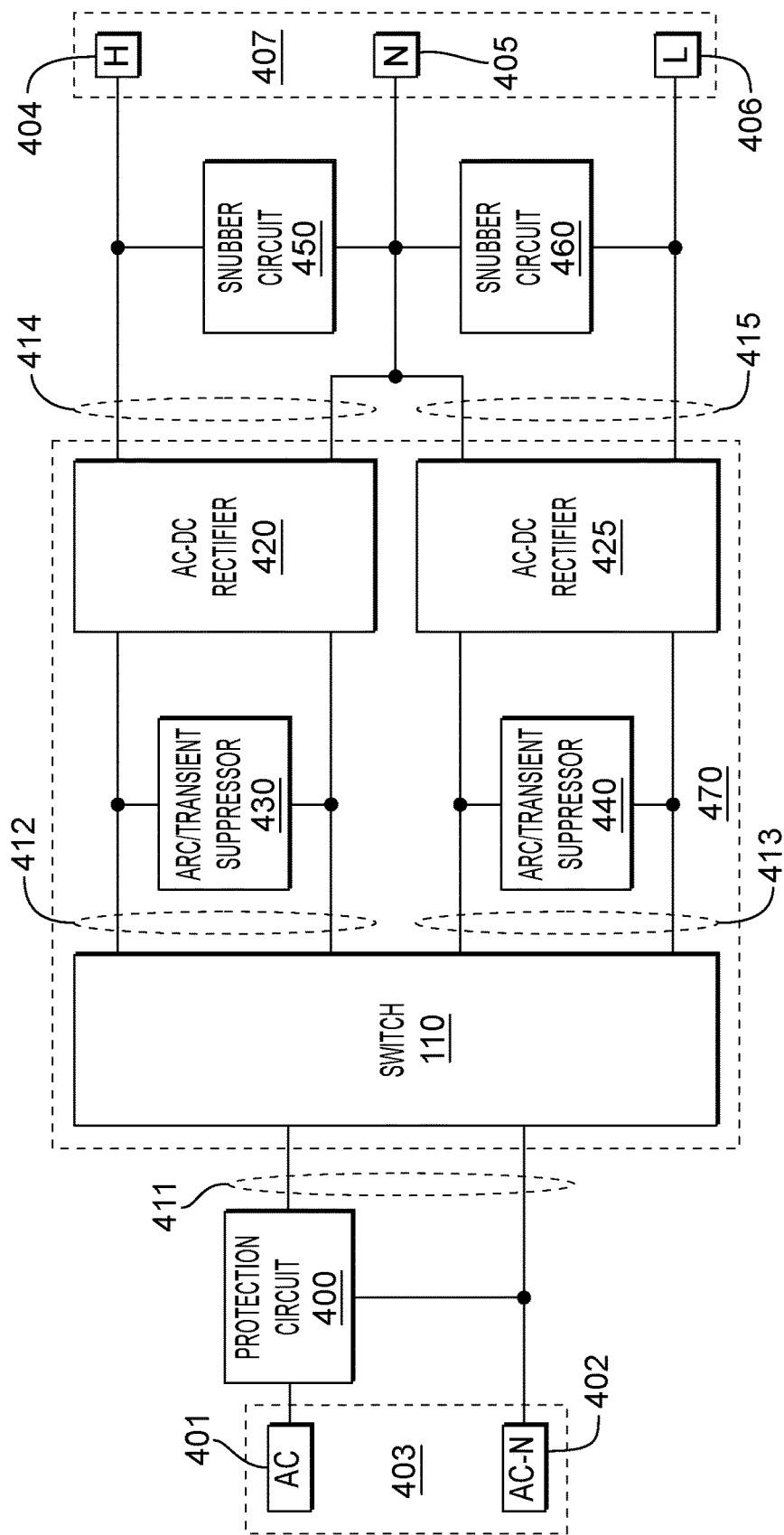
FIG. 4 is a block diagram of one embodiment of a master board.

FIG. 4 is a diagram of one embodiment of a master board 200. Power is received through a connection 403 having an AC terminal 401 and an AC-N terminal 402. The AC terminal 401 is the hot connection and the AC-N terminal 402 is the neutral connection of the external power source.

Figure 6:
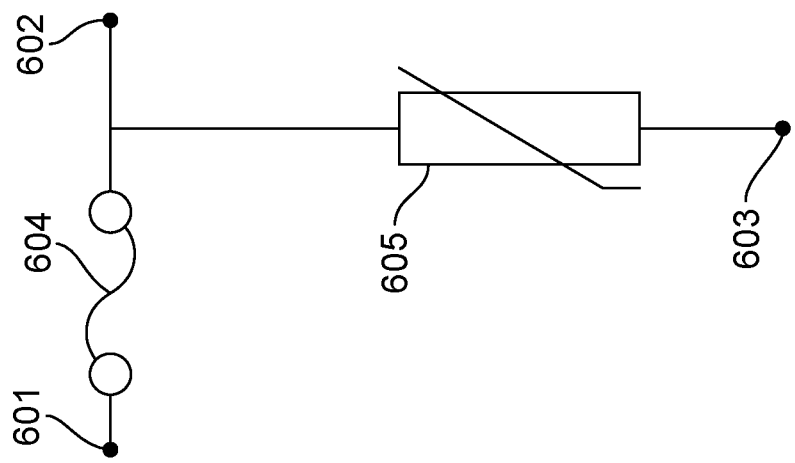
FIG. 6 is a diagram of one embodiment of a protection circuit.

A protection circuit 400 receives the power from the connection 403 and provides power on the input 411 to the input of the switch 110. In some embodiments, the protection circuit 400 is configured as shown in FIG. 6. FIG. 6 shows a fuse 604 coupled between a terminal 601 and a terminal 602, and a metal-oxide varistor 605 coupled between the terminal 602 and the terminal 603. When applied to the master board of FIG. 4, the terminal 601 is coupled to the AC terminal 401, the terminal 602 is coupled to the input of the switch 110, and the terminal 603 is coupled to the AC-N terminal 402. Other protection circuits may be used.

The switch 110 receives the power on the input 411 and switches the power onto an output 412 or an output 413 depending on which output is selected by the switch 110. In some embodiments, the switch 110 can also select neither output to cause neither output 412 nor output 413 to receive power.

Figure 7:
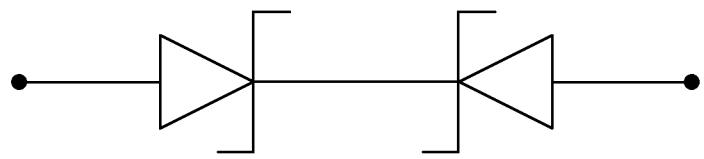
FIG. 7 is a diagram of one embodiment of an arc/transient suppressor circuit.

An arc/transient suppressor 430 receives the power on the output 412 and an arc/transient suppressor 440 receives the power on the output 413. In some embodiments, the arc/transient suppressors are configured as shown in FIG. 7. FIG. 7 shows opposed zener diodes between two terminals. Other arc/transient suppressor circuits may be used.

An AC-DC rectifier 420 is coupled to receive the output 412 and generate direct-current (DC) power on an output 414. An AC-DC rectifier 425 is coupled to receive the output 413 and generate direct-current (DC) power on an output 415.

Figure 8:
FIG. 8 is a diagram of one embodiment of a snubber circuit.

A snubber circuit 450 is coupled to condition the DC power on the output 414 and a snubber circuit 460 is coupled to condition the DC power on the output 415. In some embodiments, the snubber circuits are configured as shown in FIG. 8. FIG. 8 shows a resistor and capacitor in series across two terminals. Other snubber circuits may be used.

A connection 407 receives the power on a channel 404 and power on a channel 406 depending on the selection of the switch 110. A reference channel 405 is coupled to receive the neutral common to both the output 414 and the output 415.

A switch block 470 includes the switch 110, the AC-DC rectifier 420, and the AC-DC rectifier 425. In FIG. 4, the switch block 470 receives the input 411, performs the switching first and the AC-DC conversation afterwards to produce the output 414 and the output 415. In FIG. 4, the switch 110 is on the AC side of the circuit. However, the switch block shown in FIG. 5 performs these functions in the reverse order, and the switch is on the DC side of the circuit.

Figure 5:
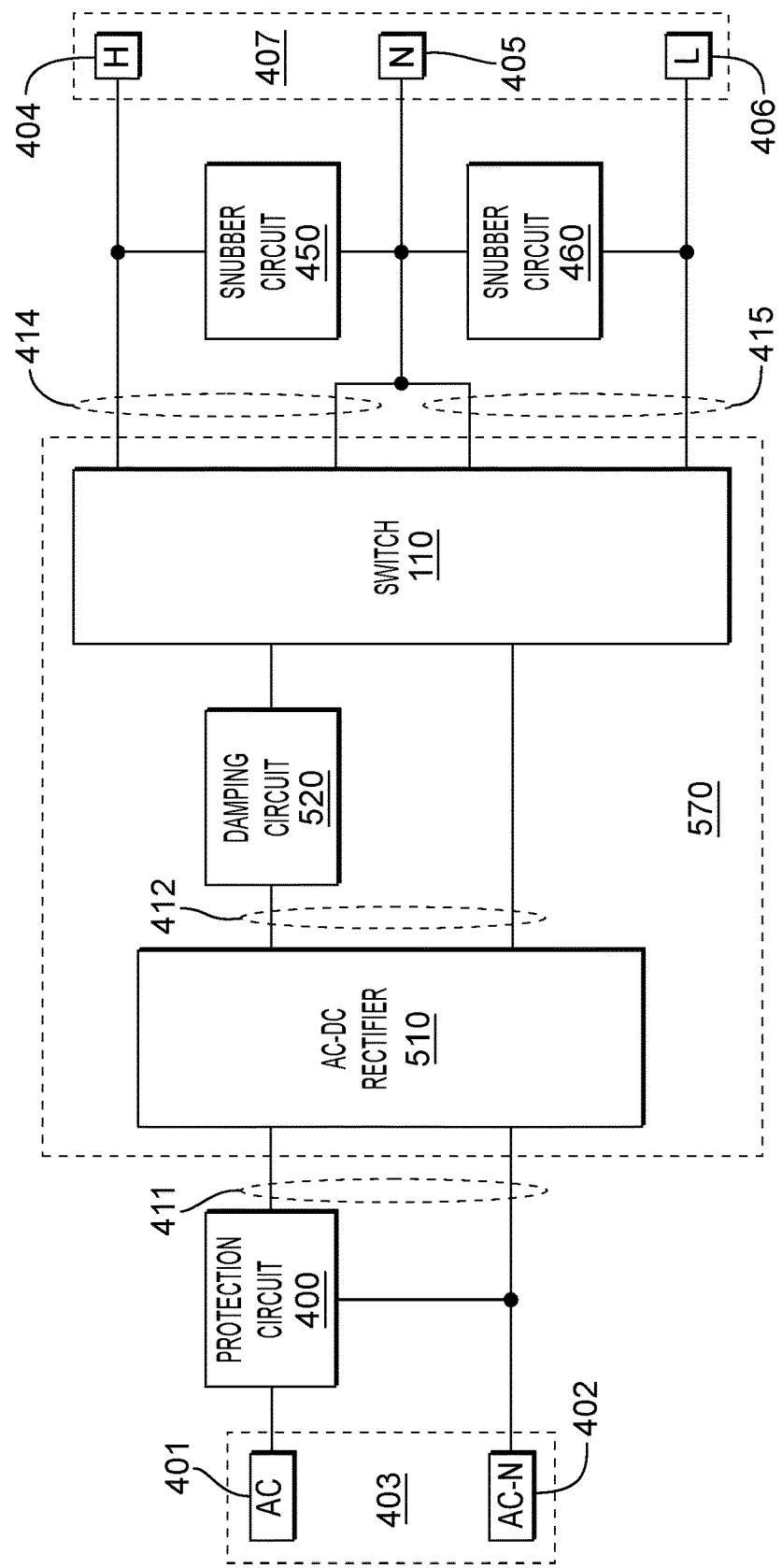
FIG. 5 is a block diagram of another embodiment of a master board.
Figure 9:
FIG. 9 is a diagram of one embodiment of a damping circuit.

FIG. 5 is a diagram of another embodiment of the master board 200. Power is received through the connection 403 having an AC terminal 401 and the AC-N terminal 402. The AC terminal 401 is the hot connection and the AC-N terminal 402 is the neutral connection of the external power source.

The protection circuit 400 receives the power from the connection 403 and provides power on the input 411 to the input of an AC-DC rectifier 510. In some embodiments, the protection circuit 400 is configured as shown in FIG. 6. Other protection circuits may be used.

The AC-DC rectifier 510 receives the power on the input 411 and drives DC power on an output 412.

A damping circuit 530 conditions the DC power on the output 412. In some embodiments, the damping circuit 530 is configured as shown in FIG. 8. FIG. 8 shows a resistor between two terminals. Other damping circuits may be used.

The switch 110 is coupled to receive the DC power on the output 412 and drive the DC power onto the output 414 or the output 415 depending on which output is selected by the switch 110. In some embodiments, the switch 110 can also select neither output to cause neither output 412 nor output 413 to receive power.

The snubber circuit 450 is coupled to condition the DC power on the output 414 and the snubber circuit 460 is coupled to condition the DC power on the output 415. In some embodiments, the snubber circuits are configured as shown in FIG. 8. Other snubber circuits may be used.

A connection 407 receives the power on the channel 404 and power on the channel 406 depending on the selection of the switch 110. The reference channel 405 is coupled to receive the neutral reference common to both the output 414 and the output 415.

A switch block 570 includes the switch 110 and the AC-DC rectifier 510. In FIG. 4, the switch block 470 performs the switching first and the AC-DC conversation afterwards. However, the switch block 570 performs these functions in the reverse order with the switch 110 on the DC side of the circuit.

Figure 10:
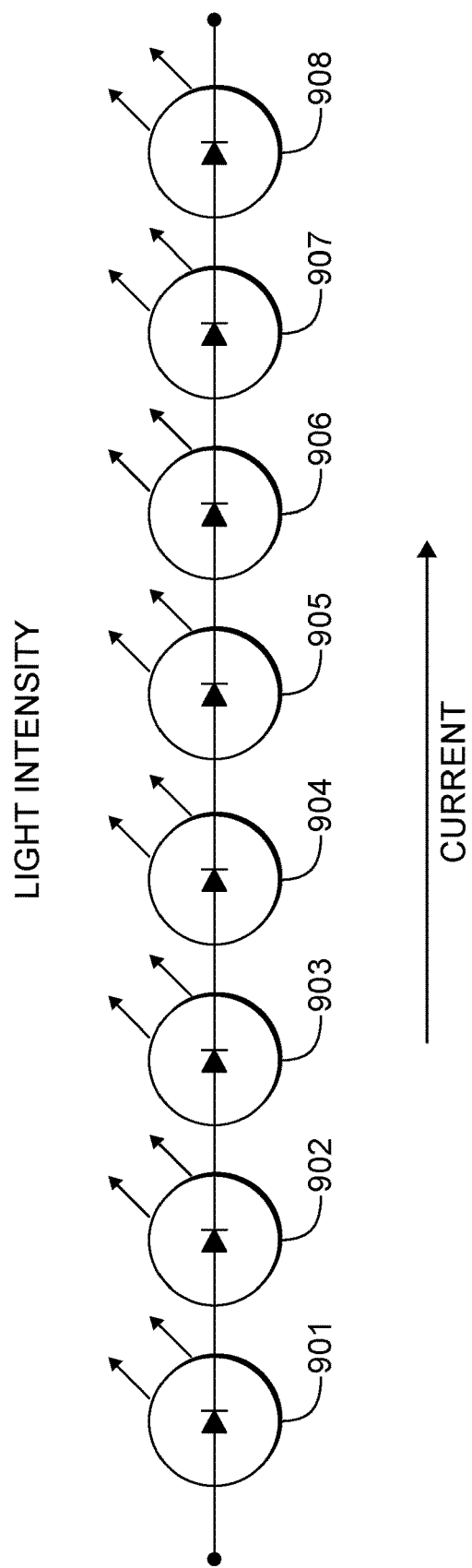
FIG. 10 is a diagram of one embodiment of an light-emitting diode (LED) array.

FIG. 10 shows a diagram of one embodiment of an LED array. The LED array includes an LED 901, an LED 902, an LED 903, an LED 904, an LED 905, an LED 906, an LED 907, and an LED 908 connected in series between two terminals. In other embodiments, more or less LEDs are connected in series. In some embodiments, the LED array is a single LED. In other embodiments, two or more sets of LEDs that are connected in series may be connected in parallel between the two terminals.

In some embodiments, the LED array is configured to produce light intensity that depends on the current driven through the terminals. In other embodiments, LED arrays may be configured to produce light of a particular characteristics, such as correlated color temperature (CCT), color rendering index (CRI), or monochromatic colors such as red, green, blue or white (RGBW). It will be apparent to one skilled in the art that LEDs of many different characteristics may be used according to the disclosure herein.

Figure 11:
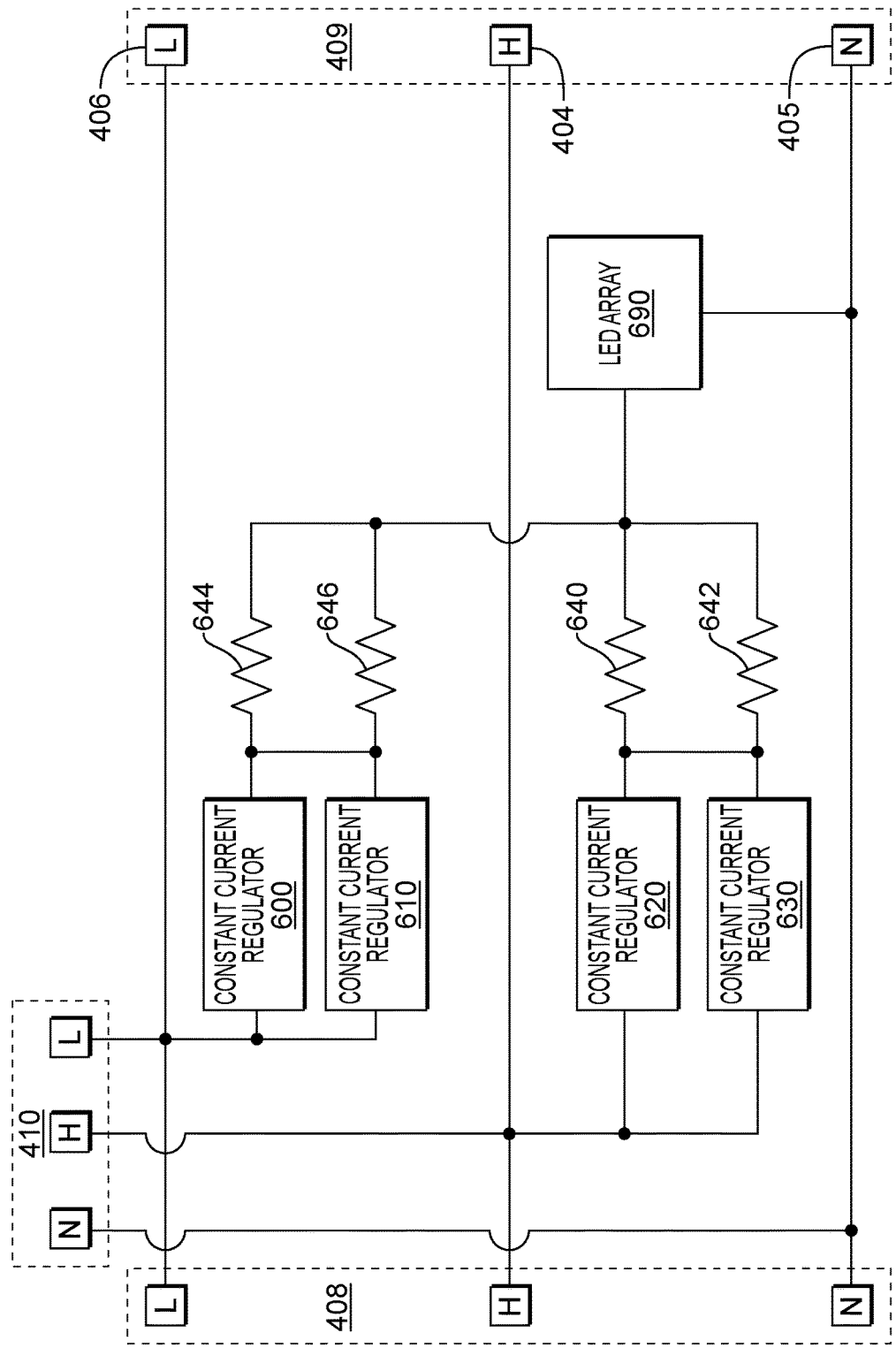
FIG. 11 is a block diagram of one embodiment of an LED board using constant current regulators.

FIG. 11 shows a diagram of one embodiment of an LED board.

A connection 408, a connection 409 and a connection 410 are configured to connect the channel 404, the channel 406 and the reference 405 to connections of a master board or other LED boards so that the channels and reference are distributed onto all the LED boards.

A constant current regulator 600 and a constant current regulator 610 are coupled to receive power on the channel 406 and a constant current regulator 620 and a constant current regulator 630 are coupled to receive power on the channel 404. When the channel 404 is powered based on the state of the switch 110, the constant current regulator 620 and the constant current regulator 630 are powered and generate current into an LED array 690. When the channel 406 is powered based on the state of the switch 110, the constant current regulator 600 and the constant current regulator 610 are powered and generate current into the LED array 690.

The first terminal of the LED array 690 receives the current from the selected sources and the second terminal of the LED array is coupled to the reference channel 405.

In some embodiments, the combination of the constant current regulator 620 and the constant current regulator 630 drive more current than the combination of the constant current regulator 600 and the constant current regulator 610. Thus, when the channel 404 is selected by the switch 110, the light intensity of the LED array 690 is greater than when the channel 406 is selected by the switch 110.

In some embodiments, the constant current regulators are selected among a few models with discrete fixed current outputs. In some embodiments, the desired current output may be lower than the closest commercially available option and resistors in series with the output are used to lower the current output. In FIG. 11, a resistor 640 and a resistor 642 are coupled between the LED array 690 and the constant current regulator 620 and the constant current regulator 630. A resistor 644 and a resistor 646 are coupled between the LED array 690 and the constant current regulator 600 and the constant current regulator 610. In other embodiments, the output of the constant current regulators for one or both of the channels is sufficient and the resistors are zero ohm jumper resistors.

In some embodiments, the switch 110 is either part number TPS92411 or part number TPS92411P (with output overvoltage protection), sold by Texas Instruments.

In some embodiments, the constant current regulators are one of a family of constant current regulators offered by ON Semiconductor. Constant current regulators may be selected based on factors including desired current level, current precision, and package type. Some constant current regulators have a specific steady state current. Other constant current regulators have a current that is adjustable within a specified range based on the resistance of a resistor coupled to the device.

Figure 12:
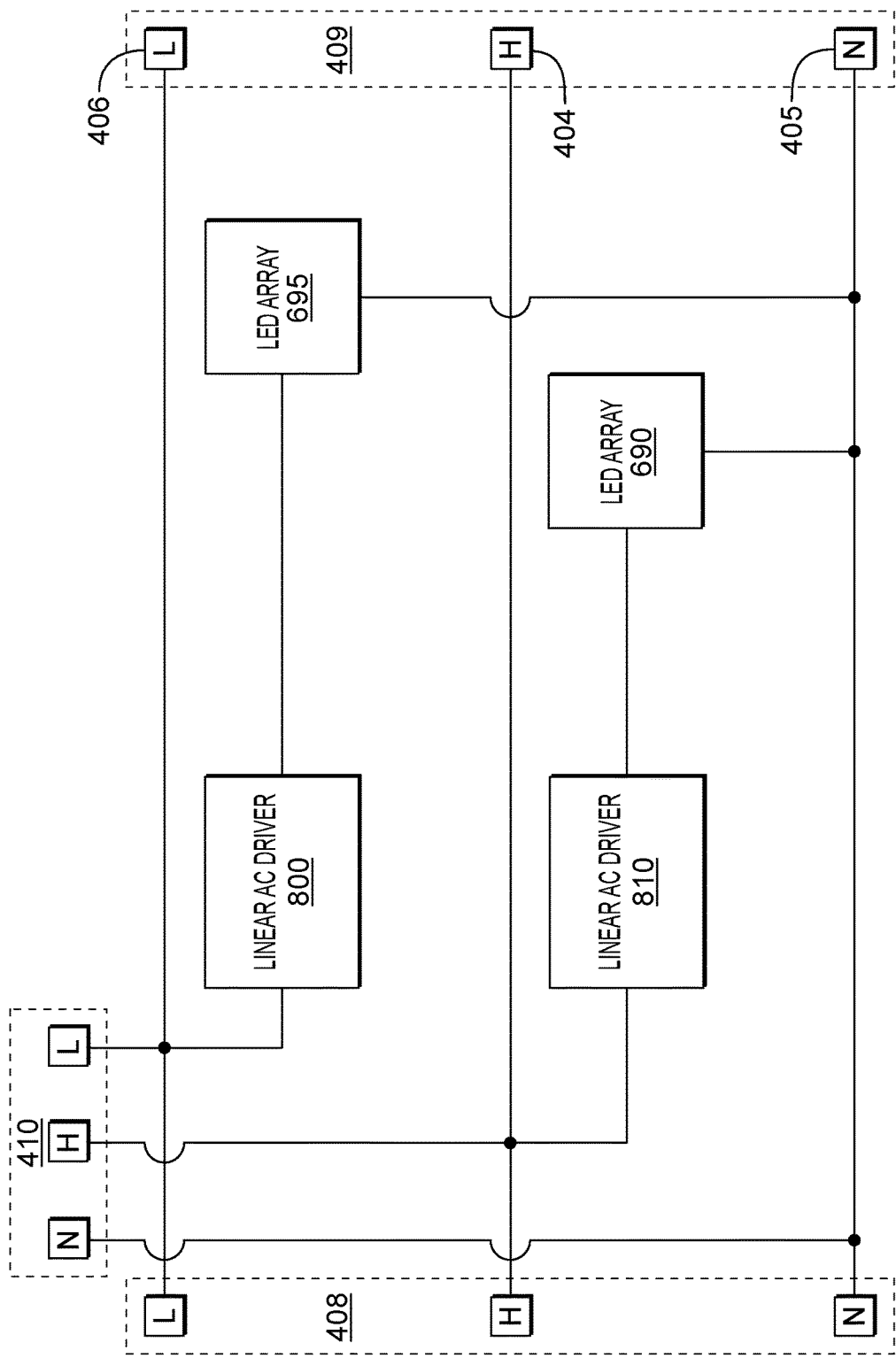
FIG. 12 is a block diagram of one embodiment of an LED board having linear AC drivers driving two LED arrays.

FIG. 12 shows a diagram of another embodiment of an LED board.

The connection 408, the connection 409 and the connection 410 are configured to connect the channel 404, the channel 406 and the reference channel 405 to connections of master boards or other LED boards so that the power and reference are distributed onto the LED boards.

A linear AC driver 800 is coupled to receive power on the channel 406 and a linear AC driver 810 is coupled to receive power on the channel 404. When the channel 404 is powered based on the state of the switch 110, the linear AC driver 810 is powered and generates current into the LED array 695. When the channel 406 is powered based on the state of the switch 110, the linear AC driver 800 is powered and generates current into the LED array 690.

In some embodiments, the LED array 690 and the LED array 695 have different light output characteristics. In some embodiments, LED array 695 generates light of one CCT and LED array 690 generates light having another CCT. In some embodiments, LED array 695 generates light of one CRI and LED array 690 generates light having another CRI. In some embodiments, LED array 695 generates light of one monochromatic color such as RGBW and LED array 690 generates light having another monochromatic color.

In some embodiments, the linear AC drivers are selected among a limited number of commercially available models with specific fixed current outputs. In some embodiments, the desired current output may be lower than the model with the closest specified current. Resistors in series with the output are used to lower the specified output current to the desired current range.

Figure 13:
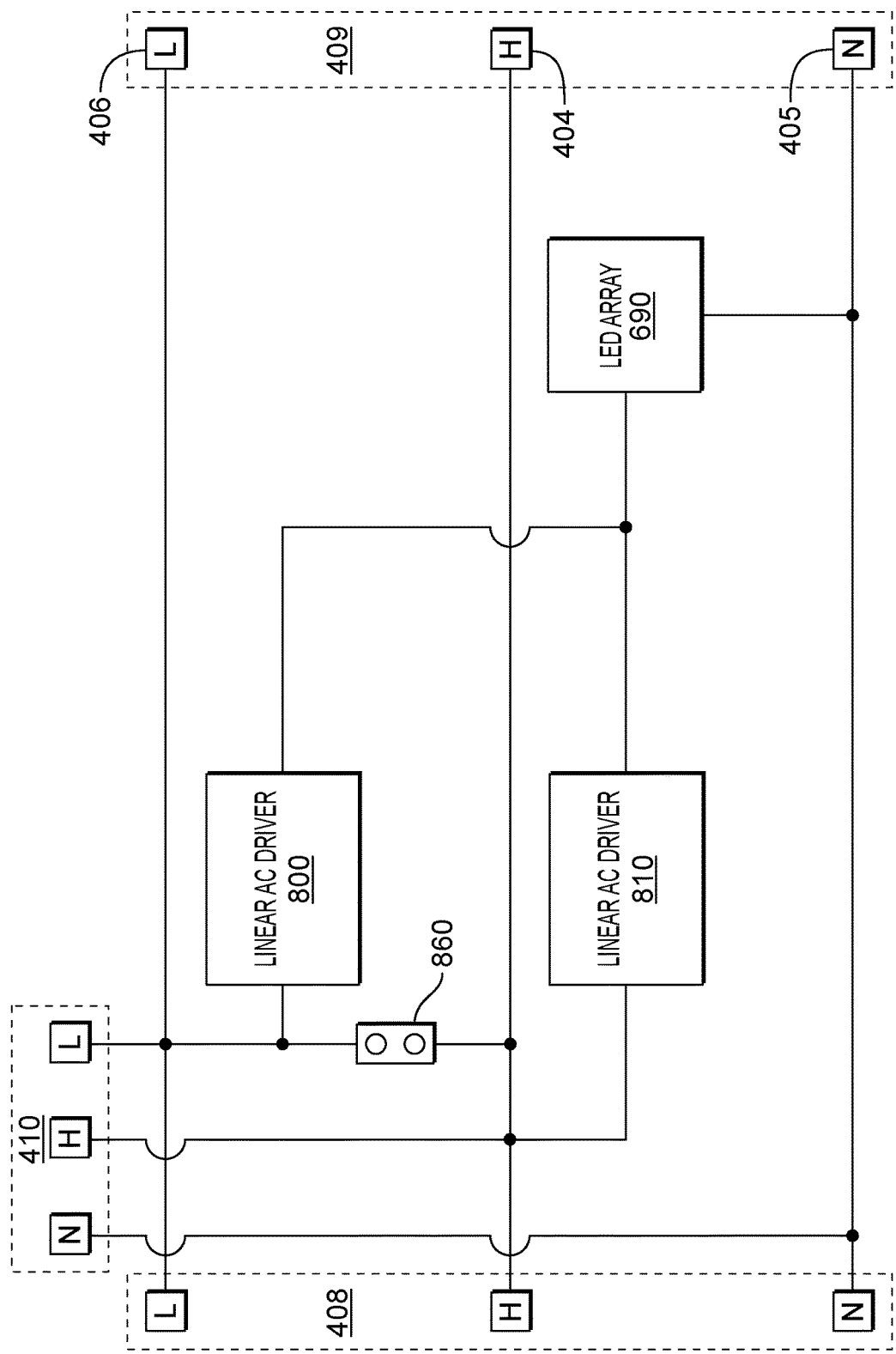
FIG. 13 is a block diagram of one embodiment of an LED board having linear AC drivers driving an LED array and including a jumper slot.

FIG. 13 shows a diagram of another embodiment of an LED board.

The connection 408, the connection 409 and the connection 410 are configured to connect the channel 404, the channel 406 and the reference channel 405 to connections of master boards or other LED boards so that the power and reference are distributed onto the LED boards.

A linear AC driver 800 is coupled to receive power on the channel 406 and a linear AC driver 810 is coupled to receive power on the channel 404. When the channel 404 is powered based on the state of the switch 110, the linear AC driver 810 is powered and generates current into the LED array 690. When the channel 406 is powered based on the state of the switch 110, the linear AC driver 800 is powered and generates current into the LED array 690. In some embodiments, the current produced the linear AC driver 810 is greater than the current produced by the linear AC driver 100. Greater current causes the LED array 690 to produce more light.

A zero-ohm jumper resistor may be used to connect the terminals of a jumper slot 860 to couple the channel 406 and the channel 404. When the jumper slot 860 is shorted, both the linear AC driver 800 and the linear AC driver 810 are powered when either the channel 404 or the channel 406 is selected by the switch 110 on the master board. The current produced by both linear ac driver 800 and linear ac driver 810 operating simultaneously is greater than either operating individually. The greater current causes the LED array 690 to produce more light than either switch selection when the jumper slot 860 is not shorted.

In some embodiments, the linear AC driver 800 is an application specific integrated circuit (ASIC). Linear AC Driver ASICs are manufactured by MagnaChip, SiliconWorks, Seoul Semiconductor and others. In some embodiments, resistors are used to control the output of the corresponding ASICs to produce current within a specified range according to ASIC manufacturer specifications.

Figure 14:
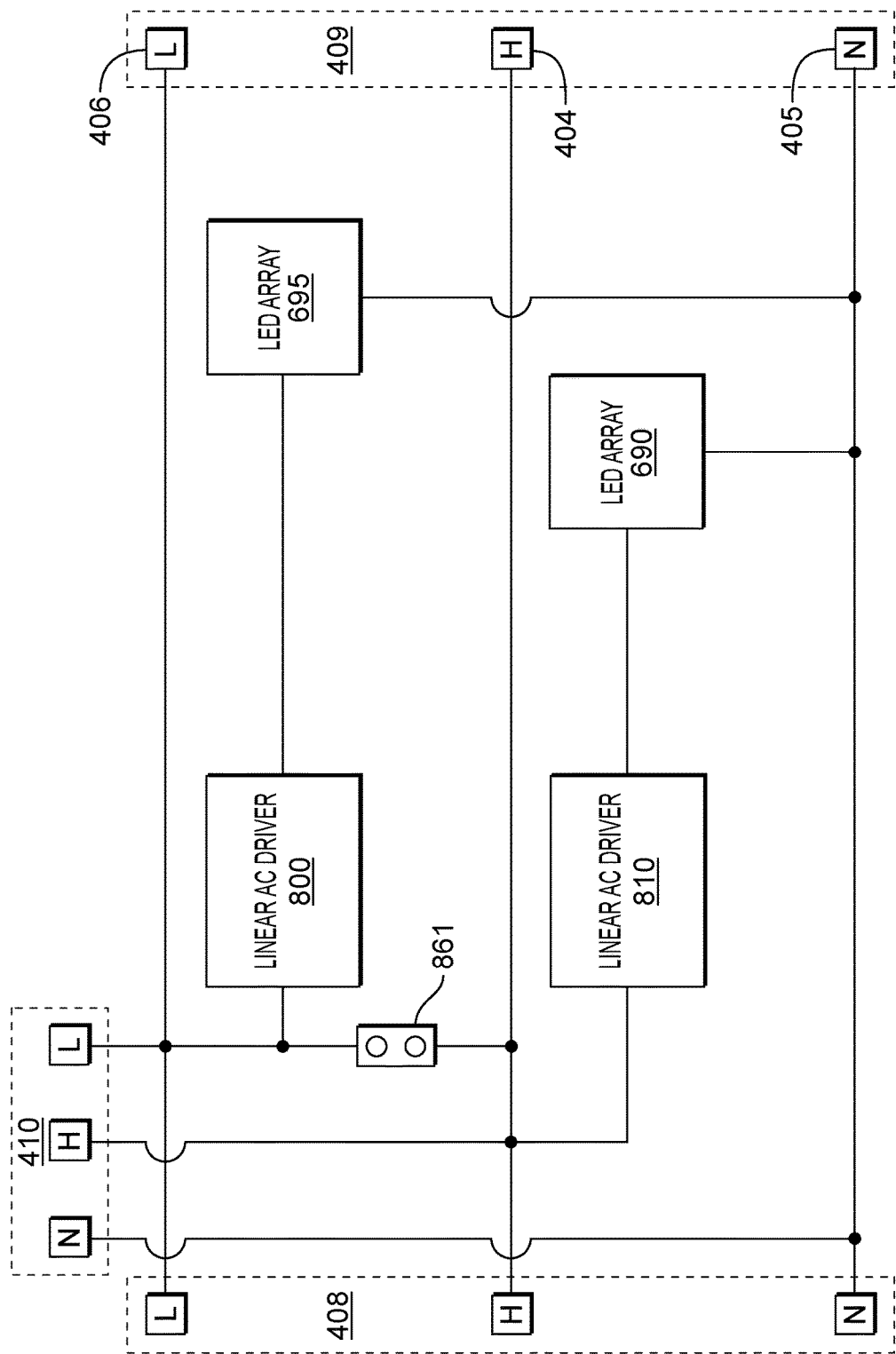
FIG. 14 is a block diagram of one embodiment of an LED board having linear AC drivers driving two LED arrays and including a jumper slot.

FIG. 14 shows a diagram of another embodiment of an LED board.

The connection 408, the connection 409 and the connection 410 are configured to connect the channel 404, the channel 406 and the reference 405 to connections of master boards or other LED boards so that the power and reference are distributed onto all the LED boards.

A linear AC driver 800 is coupled to receive power on the channel 406 and a linear AC driver 810 are coupled to receive power on the channel 404. When the channel 404 is powered based on the state of the switch 110, the linear AC driver 810 is powered and generates current into the LED array 690. When the channel 406 is powered based on the state of the switch 110, the linear AC driver 800 is powered and generates current into the LED array 695.

In other embodiments, the LED array 690 may be configured to produce light of a particular correlated color temperature (CCT), color rendering index (CRI), or monochromatic color such as red, green, blue or white (RGBW) and the LED array 695 may be configured to produce light of a different correlated color temperature (CCT), color rendering index (CRI), or monochromatic color such as red, green, blue or white (RGBW) than that of the LED array 695. Thus, the switch 110 may control the light characteristics of the light fixture.

A zero-ohm resistor may be used to connect the terminals of a jumper slot 861 optionally couples the channel 406 and the channel 404. When the jumper slot 861 is shorted, both the linear AC driver 800 and the linear AC driver 810 are powered when either the channel 404 or the channel 406 is selected by the switch 110 on the master board. Thus, both the LED array 690 and the LED array 695 are powered simultaneously producing light having both characteristics simultaneously.

In some embodiments, resistors may be used in series with the output of the linear AC drivers or as a control input to the linear AC drivers to control set the current output as desired. In other embodiments, the linear AC drivers are used without such associated resistors.

Figure 15:
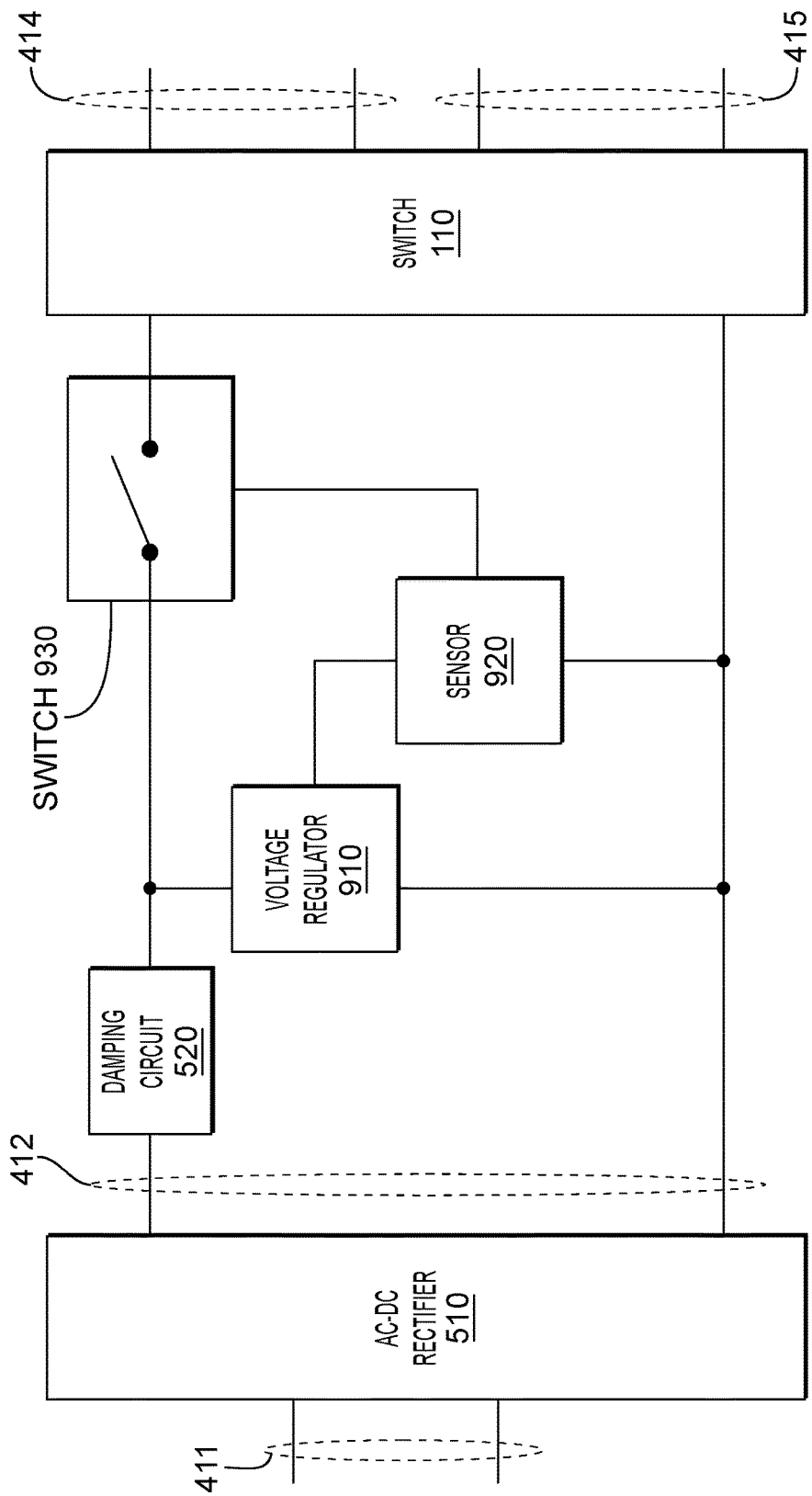
FIG. 15 is a block diagram of a switching block having a sensor.

FIG. 15 shows a diagram of another embodiment of a switch block for a master board.

An AC-DC Rectifier 510 receives AC power on the input 411 and generates DC power on an output 412. The damping circuit 520 is configured to condition the power signal.

A voltage regulator 910 is coupled to receive the conditioned DC power and provide a regulated voltage to a sensor 920. The sensor 920 controls a switch 930 by driving a signal that depends on the sensed condition of the sensor 920. In some embodiments, the sensor 920 may be configured to sense motion, light, or sound in an area around the light fixture.

In a motion sensor, when motion is not detected by the sensor 920, the sensor provides a signal to the switch 930 that causes the switch to be open so that the output 412 is not passed onto the input of the switch 110. In such a state, neither the output 414 nor the output 415 receives power regardless of the output selected by the switch 110. Any LED boards connected to the output 414 and the output 415 do not power any corresponding LED arrays. Thus, when no motion is detected, the LED arrays dependent on that sensor are not powered.

When motion is detected by the sensor 920, the light switch 930 connects the output 412 to the input of the switch 110 thereby powering the selected one of the output 414 or the output 415. Thus, when motion is detected, Any LED boards connected to one of the output 414 and the output 415 powers any corresponding LED arrays.

Similarly, when sensor 920 is a sound sensor, any LED arrays dependent on the sensor may be powered only when sound is detected.

When sensor 920 is a light sensor, the switch may be configured to behave in the reverse manner as compared to a motion detector. Generally one wants to light an area when a person is in the area as determined by motion or sound. However, one wants to light an area when it is not sufficiently lit by other light sources, such as natural light through windows. Thus a light sensor connects the switch when sufficient light is not detected, and opens the switch when sufficient light is detected.

Figure 16:
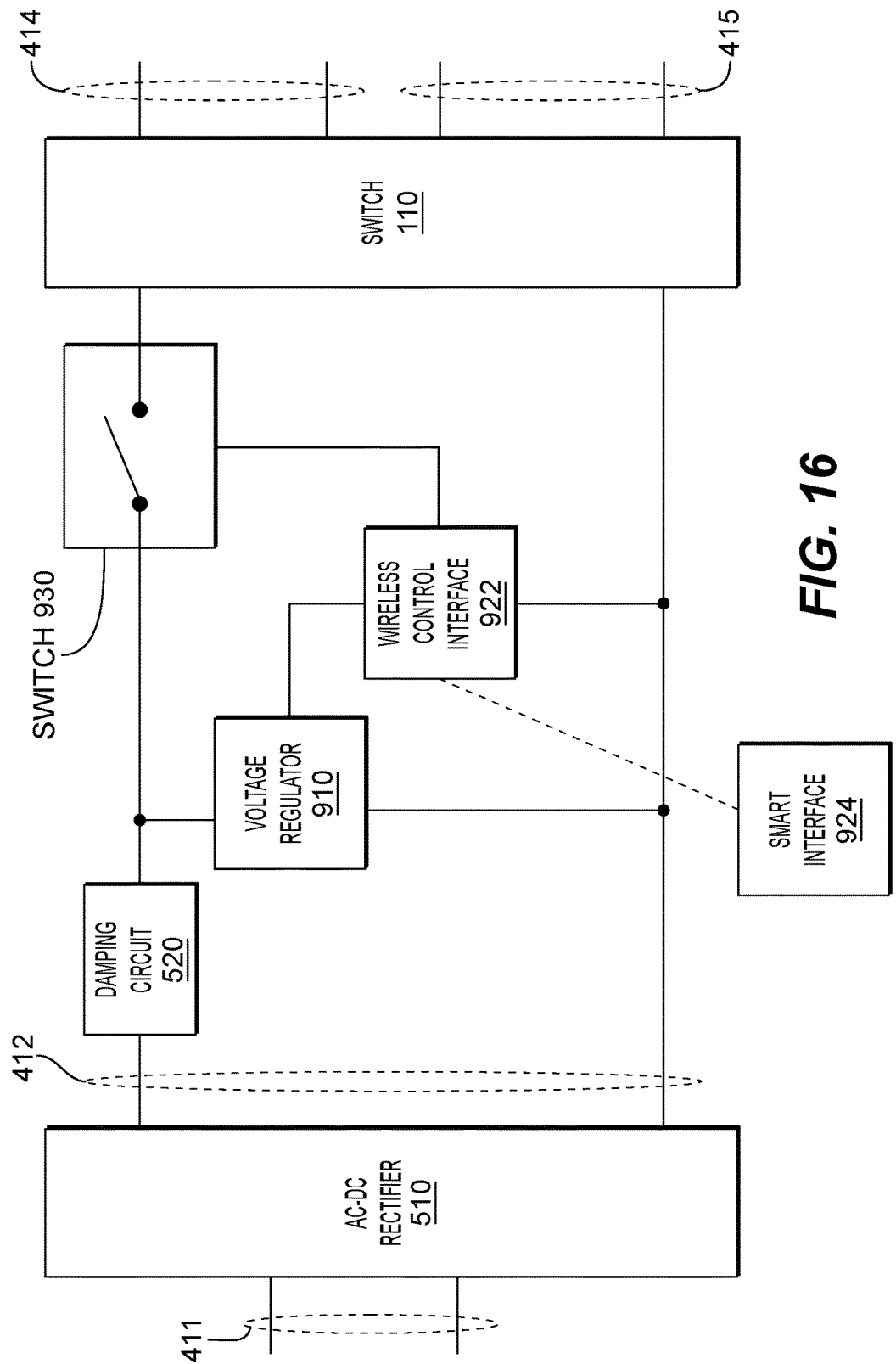
FIG. 16 is a block diagram of a switching block having a wireless control interface.

FIG. 16 shows a diagram of another embodiment of a switch block for a master board.

The switch block operates in a similar manner to the switch block shown in FIG. 15. However, a wireless control interface 922 is powered by the voltage regulator 910 and controls the switch 930 dependent on a wireless control signal received via a wireless link from a smart interface 924. The wireless link may be wireless connections that are based on the Institute of Electrical and Electronics Engineers' (IEEE) 802.11 standards (Wi-Fi), Bluetooth, and Zigbee. It will be apparent to one skilled in the art that any wireless link may be used to connect to the wireless control interface 922.

The smart interface 924 may use any number of manual or programmatic means to determine the control signal sent. For example, the smart interface may include a manual switch that allows a person to turn the switch 930 on or off. Alternatively, the smart interface 924 is programmed to automatically turn the switch 930 on or off at certain times or based on other input conditions.

Figure 17:
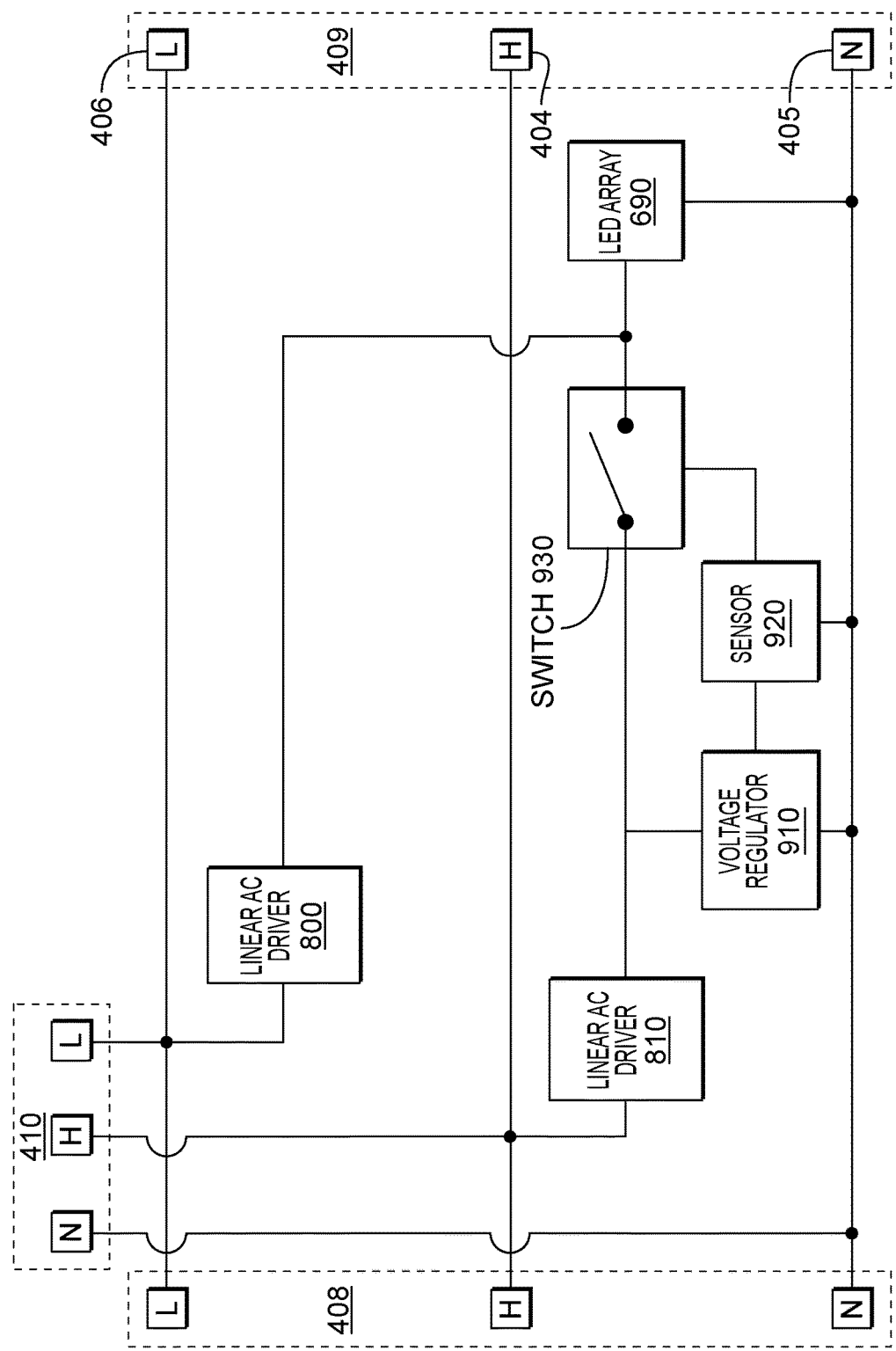
FIG. 17 is a block diagram of one embodiment of an LED board having a sensor and linear AC drivers driving an LED array.

FIG. 17 shows a diagram of another embodiment of an LED board.

The connection 408, the connection 409 and the connection 410 are configured to connect the channel 404, the channel 406 and the reference channel 405 to connections of master boards or other LED boards so that the power and reference are distributed onto the LED boards.

A linear AC driver 800 is coupled to receive power on the channel 406 and a linear AC driver 810 is coupled to receive power on the channel 404. When the channel 404 is powered based on the state of the switch 110, the linear AC driver 810 is powered and generates current into the LED array 690 dependent on the state of the sensor 920. In this way, the switch 110 on the master board can determine whether or not the LED array 690 depends on the state of the switch 110.

The linear AC driver 810 powers the voltage regulator 910 which in turn provides a regulated voltage to the sensor 920. The sensor 920 may detect environmental conditions such as light, sound and motion to control the switch 930 accordingly. In some embodiments, when motion is detected, the switch is closed to power the LED array 690. In other embodiments, when light is detected, the switch is opened to prevent the output of linear AC driver 810 from powering the LED array 690.

Figure 18:
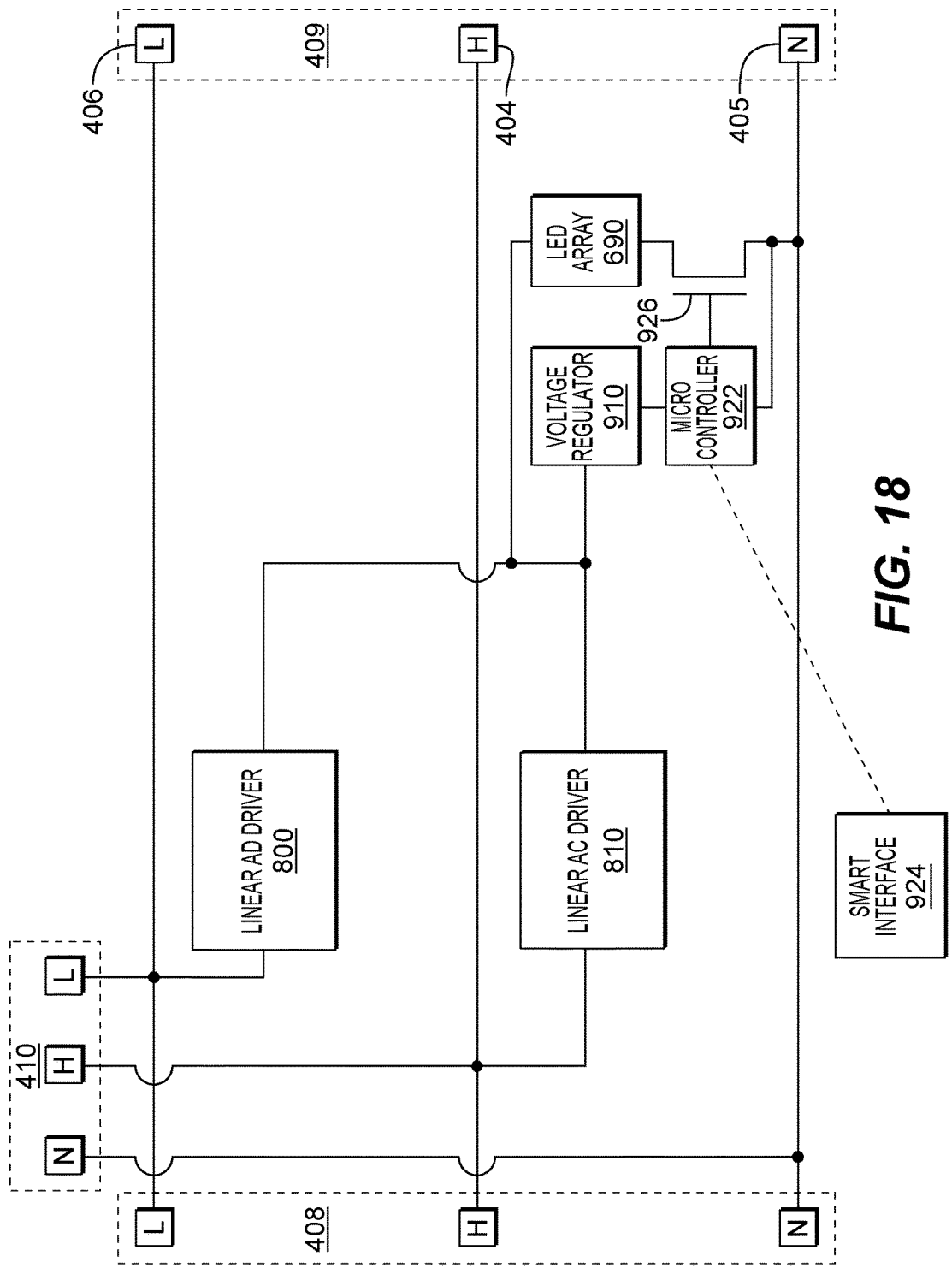
FIG. 18 is a block diagram of one embodiment of an LED board having a wireless dimmer control and linear AC drivers driving an LED array.

FIG. 18 shows a diagram of another embodiment of an LED board.

The connection 408, the connection 409 and the connection 410 are configured to connect the channel 404, the channel 406 and the reference channel 405 to connections of master boards or other LED boards so that the power and reference are distributed onto the LED boards.

A linear AC driver 800 is coupled to receive power on the channel 406 and a linear AC driver 810 is coupled to receive power on the channel 404. When the channel 404 is powered based on the state of the switch 110, the linear AC driver 810 is powered and generates current into the LED array 690. In some embodiments, the current produced the linear AC driver 810 is greater than the current produced by the linear AC driver 100. Greater current causes the LED array 690 to produce more light.

The voltage regulator 910 is powered by one or both of the constant current regulators and provides a regulated voltage to a micro-controller. A smart interface 924 wirelessly connects with the micro-controller 922. In some embodiments, the wireless connection may be established according to various wireless standards such as WiFi, Bluetooth, or Zigbee. Other types of wireless links may be used.

The microcontroller controls the resistance of a transistor 926 based on the control signal received over the wireless connection with the smart interface 924 and \ feedback from the current through the transistor 926. The effect of the resistance of the transistor 926 is to reduce the current through the LED array 690, thereby dimming the light produced by the LED array 960.

When the resistance is at the smallest level, the LED array is at one of two maximum light intensities each corresponding to one of the linear AC driver 800 and the linear AC driver 810. As the resistance of the transistor 926 is increased by the microcontroller 922, the LED array 690 is dimmed. In some embodiments, the microcontroller receives an indication of dimming according to a standard 0-10 volt dimming control.

Figure 19:
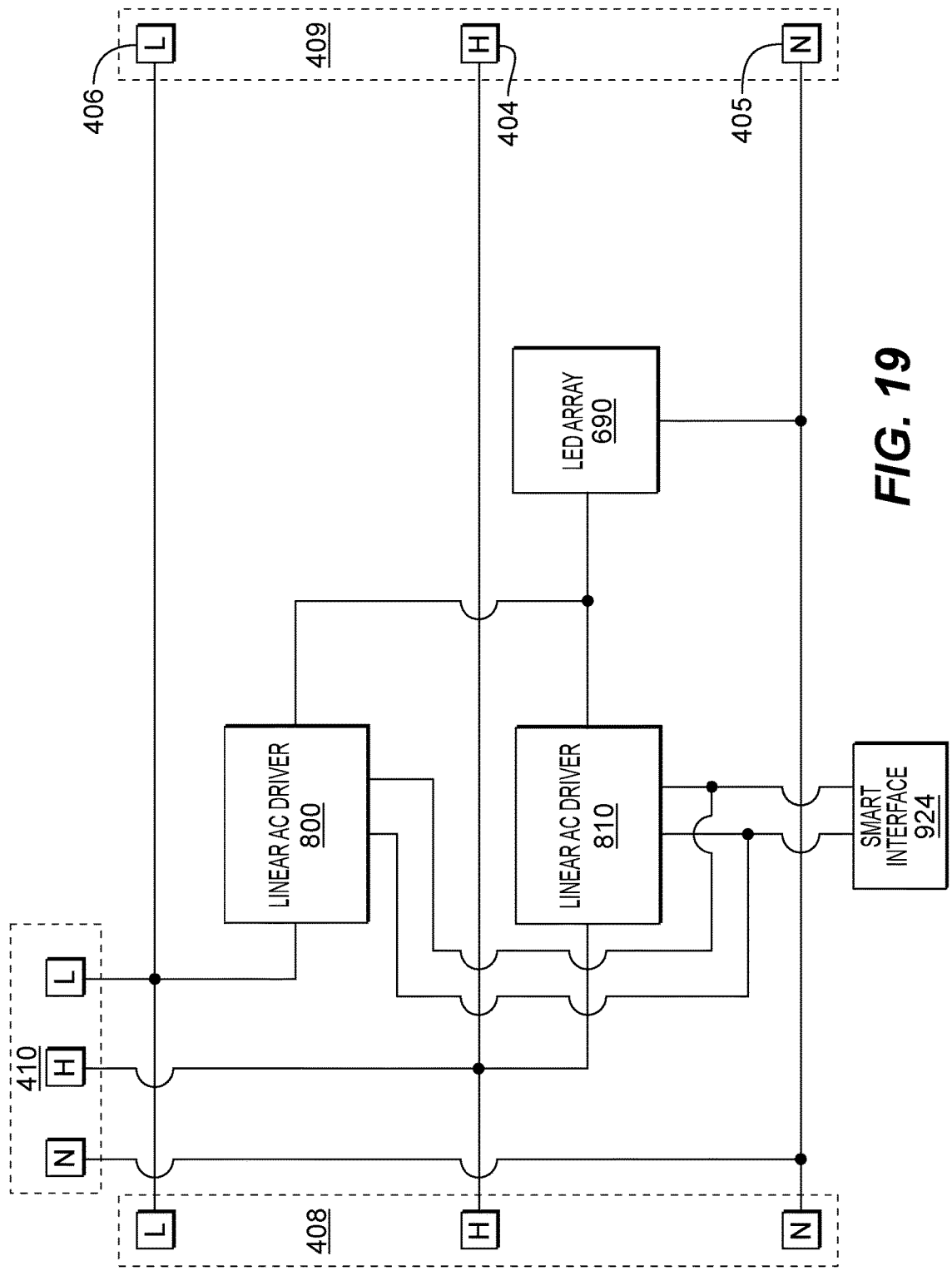
FIG. 19 is a block diagram of one embodiment of an LED board having a wireless dimmer control and linear AC drivers driving an LED array.

FIG. 19 shows a diagram of another embodiment of an LED board.

The connection 408, the connection 409 and the connection 410 are configured to connect the channel 404, the channel 406 and the reference channel 405 to connections of master boards or other LED boards so that the power and reference are distributed onto the LED boards.

A linear AC driver 800 is coupled to receive power on the channel 406 and a linear AC driver 810 is coupled to receive power on the channel 404. When the channel 404 is powered based on the state of the switch 110, the linear AC driver 810 is powered and generates current into the LED array 690. In some embodiments, the current produced the linear AC driver 810 is greater than the current produced by the linear AC driver 100. Greater current causes the LED array 690 to produce more light.

A smart interface 924 is coupled to the input a dimming control signal to the linear AC driver 800 and the linear AC driver 810. In some embodiments, the dimming control signal is generated according to a 0-10 volt dimming control standard.

Figure 20:
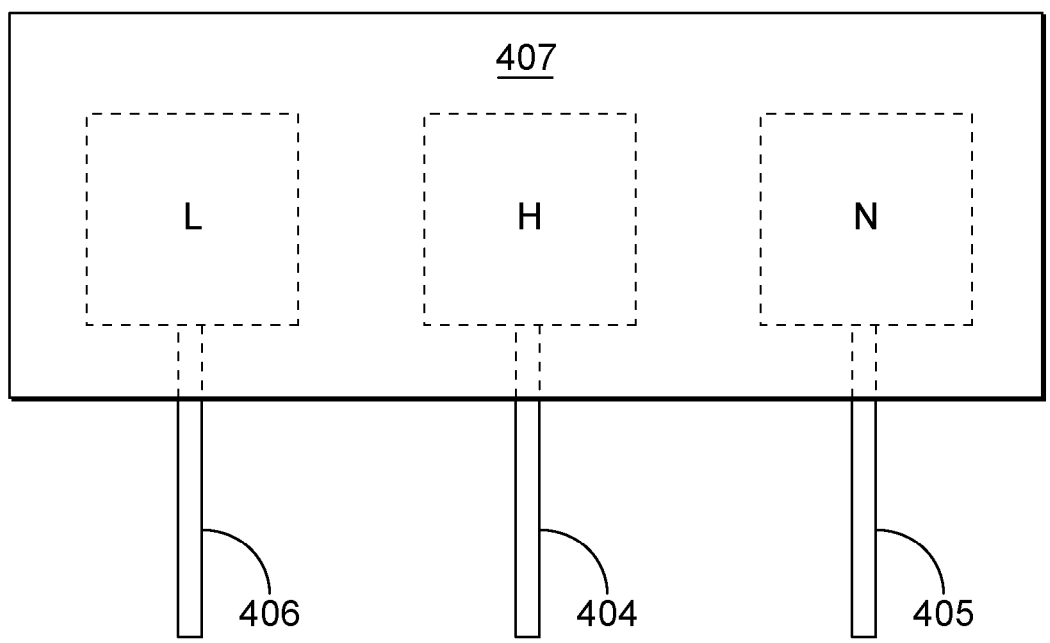
FIG. 20 is a top view of a board connection having two channels.

FIG. 20 illustrates a top view of one embodiment of a connection.

The connection 407 is mountable onto a circuit board through internal connections that electrical conduct to pins protruding horizontally. The pins are positioned in a standard order so that the appropriate channels and reference can interface to the corresponding channels and reference on master boards and other LED boards.

The diagram of circuits in other figures show logical schematics rather than physical circuits. Different ordering of the logical layout of the different connections is not meant to indicate that the corresponding physical connection necessarily uses that ordering.

In the illustrated embodiment, the channel 406, the channel 404 and the reference 405. A corresponding connection (not shown) is configured to receive the pins and make electrical contact with the channel 406, the channel 404 and the reference 405. In some embodiments, connections having different physical characteristics and mating schemes may be used. In other embodiments, connections having more channels and references may be used.

The foregoing specification provides a description with reference to specific exemplary embodiments. The specification and drawings are to be regarded in an illustrative sense rather than a restrictive sense. Various modifications may be made thereto without departing from the spirit and scope as set forth in the following claims.

While the examples, generally show the selection of one of two channels having different effects on the connected LED boards, it will be apparent to one skilled in the art that more channels may be implemented and that each channel may selectively enable lighting characteristics and features such as LED color, CCT, CRI, and flux, light, motion and sound sensors, and wireless control features, individually or in combination. While certain lighting characteristics and features are illustrated herein, other such characteristics and features may be selectively enabled without departing from the spirit and scope as set forth in the following claims.

What is claimed is:

1. A light fixture comprising:
  a master board having an input to receive AC power, an AC-DC rectifier coupled to receive AC power and generate DC power, and a power output connector to supply DC power; and
  a first light-emitting diode (LED) board having a first end and a second end, and coupled to receive the DC power, the first LED board comprising:
    a first LED array;
    a first linear AC driver coupled to receive the DC power and drive a current through the first LED array;
    a power input connector connectable to the power output connector and connected to the first linear AC driver;
    a first power input/output connector positioned at the first end, and connected to the power input connector; and
    a second power input/output connector positioned at the second end, and connected to the power input connector and the first power input/output connector.

2. The light fixture of claim 1 further comprising a plurality of LED boards each comprising at least one linear AC driver driving at least one LED, wherein each of the plurality of LED boards are connected in parallel to the first LED board.

3. The light fixture of claim 2 wherein the plurality of LED boards have a ladder spatial arrangement.

4. The light fixture of claim 2 wherein the first LED board has a shape consisting of one of round, square, hexagon, and octagon.

5. The light fixture of claim 1 further comprising:
  a second LED board coupled to receive DC power comprising:
    a second LED array; and
    a second linear AC driver coupled to receive the DC power and drive current through the second LED array.

6. The light fixture of claim 5 wherein the first linear AC driver is a constant current regulator and the second linear AC driver is a constant current regulator.

7. The light fixture of claim 5 wherein the first linear AC driver is an application specific integrated circuit (ASIC) and the second linear AC driver is an ASIC.

8. A light fixture comprising:
  a master board having an input to receive AC power, a switch, an AC-DC rectifier, and a power output connector, the master board configured to receive the AC power and drive DC power on a selected one of a plurality of channels depending on the switch; and
  a first light-emitting diode (LED) board coupled to receive DC power on any of the plurality of channels, the first LED board comprising:
    a first LED array;
    a plurality of linear AC drivers each coupled to receive the DC power on one of the plurality of channels, wherein the first LED array is coupled to receive current from a first linear AC driver of the plurality of linear AC drivers;
    a power input connector connectable to the power output connector and connected to the plurality of linear AC drivers;
    a first power input/output connector positioned at a first end of the first LED board, and connected to the power input connector; and
    a second power input/output connector positioned at a second end of the first LED board, and connected to the power input connector and the first power input/output connector.

9. The light fixture of claim 8 wherein the LED board has a shape consisting of one of round, square, hexagon, and octagon.

10. The light fixture of claim 8 wherein the first LED array is coupled to receive current from at least two of the plurality of linear AC drivers, the first linear AC driver of the plurality of linear AC drivers is configured to generate more current than a second linear AC driver of the plurality of linear AC drivers.

11. The light fixture of claim 8 wherein the AC-DC rectifier is coupled to receive AC power and drive DC power and the switch is coupled to receive the DC power and drive the DC power on a selected one of the plurality of channels depending on the switch.

12. The light fixture of claim 8 wherein the switch is coupled to receive the AC power and drive the AC power on a selected one of a plurality on nodes depending on the switch, and a plurality of AC-DC rectifiers each coupled to receive AC power on one of the plurality of nodes and drive DC power on one of the plurality of channels.

13. The light fixture of claim 8 wherein the first LED board further comprises:
   a second LED array wherein the second LED array is coupled to receive current from a second linear AC driver of the plurality of linear AC drivers.

14. The light fixture of claim 8 further comprising a sensor configured to detect a condition, wherein the first LED array is conditionally coupled to receive current from a first linear AC driver of the plurality of linear AC drivers depending on the condition detected by the sensor.

15. The light fixture of claim 14 wherein the condition detected is at least one of motion, light and sound.

16. The light fixture of claim 8 further comprising a wireless control interface configured to detect and receive a wireless control signal, wherein the first LED array is conditionally coupled to receive current from a first linear AC driver of the plurality of linear AC drivers depending on the wireless control signal.

17. The light fixture of claim 8 further comprising a second LED array wherein the first LED array is coupled to receive current from each of the plurality of linear AC drivers coupled to a first channel of the plurality of channels and the second LED array is coupled to receive current from each of the plurality of linear AC drivers coupled to a second channel of the plurality of channels.

18. The light fixture of claim 17 where the first LED array generates light having a different color than the second LED array.

19. The light fixture of claim 17 where the first LED array generates light having a different color rendering index (CRI) than the second LED array.

20. The light fixture of claim 17 where the first LED array generates light having a different correlated color temperature (CCT) than the second LED array.

21. The light fixture of claim 8 wherein each of the plurality of linear AC drivers is a constant current regulator.

22. The light fixture of claim 8 wherein each of the plurality of linear AC drivers is an application specific integrated circuit (ASIC).

* * * * *